United States Patent [19]

Malinowski

[11] Patent Number: 4,823,300
[45] Date of Patent: Apr. 18, 1989

[54] PERFORMING BINARY MULTIPLICATION USING MINIMAL PATH ALGORITHM

[75] Inventor: Chrostopher W. Malinowski, Melbourne Beach, Fla.

[73] Assignee: Harris Corporation, Melbourne, Fla.

[21] Appl. No.: 51,386

[22] Filed: May 19, 1987

[51] Int. Cl.[4] .............................................. G06F 7/52
[52] U.S. Cl. ...................................... 364/757; 364/754
[58] Field of Search .......................... 364/754, 757–760, 364/715

[56] References Cited

U.S. PATENT DOCUMENTS

| | | | |
|---|---|---|---|
| 4,546,446 | 10/1985 | Machida | 364/759 |
| 4,638,449 | 1/1987 | Frey | 364/760 |
| 4,646,257 | 2/1987 | Essig et al. | 364/760 |

OTHER PUBLICATIONS

Finn, "LSI Hardware Implements Signal Processing Algorithms", Computer Design, vol. 19, No. 3, Mar. 1980, pp. 137–142.

*Primary Examiner*—Gary V. Harkcom
*Assistant Examiner*—Tan V. Mai
*Attorney, Agent, or Firm*—Barnes & Thornburg

[57] ABSTRACT

A binary multiplier architecture which performs two's complement multiplication when the multiplier has 1's in more than half of its bits and performs unsigned binary multiplication by adding only shifted multiplicand vectors as a function of the multiplier all other times. Two's complement multiplication is performed by adding a multiplicand and a multiplier to two's complemented shifted multiplicand vectors as a function of the two's complement of the multiplier. To reduce the number of additions necessary, portions of the operands are merged with the shifted complemented vectors prior to addition of the shifted vectors. Carry lookahead may be provided to increase the speed.

34 Claims, 13 Drawing Sheets

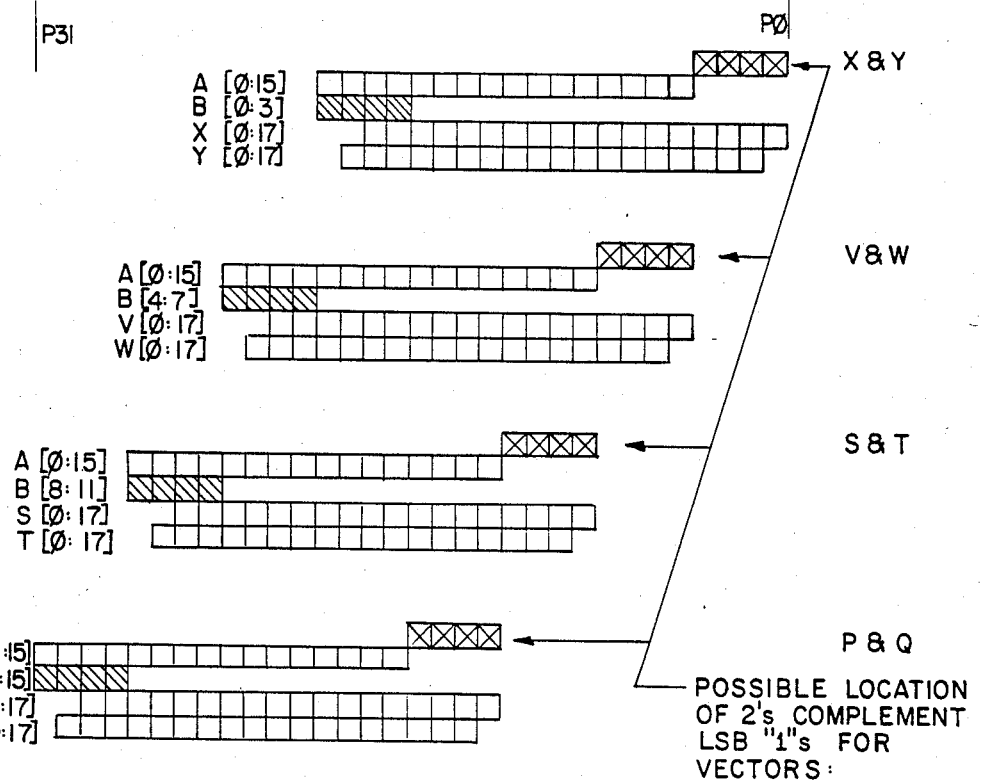
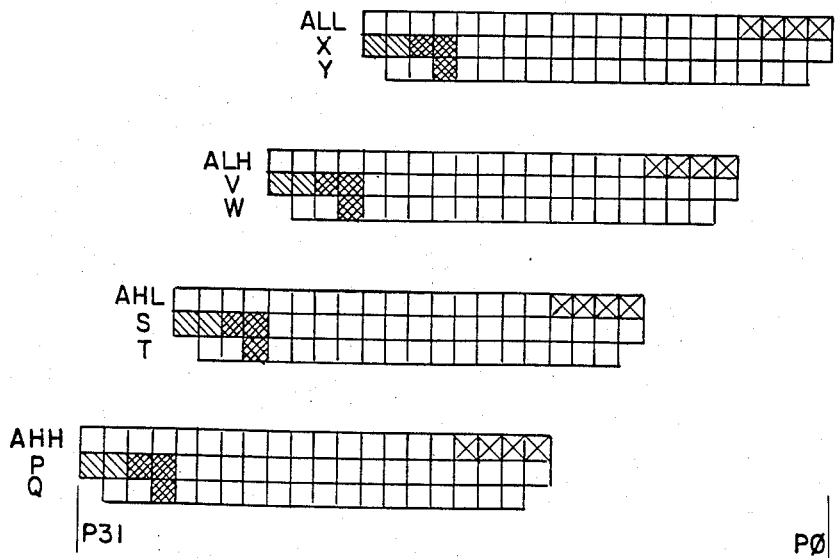
FIG. 13 a
FIG. 13 b

PERFORMING BINARY MULTIPLICATION USING MINIMAL PATH ALGORITHM

BACKGROUND AND SUMMARY OF THE INVENTION

The present invention relates generally to binary multipliers and more specifically to an improved speed binary multiplier All modern fast binary multipliers utilize some variations of the basic partial-product generation technique first applied by Seymour Cray and commonly referred to as "combinatorial", "paper and pencil", or "flow-through". In its most common form the technique simply involves consecutive multiplications of a K-digit M-digit long operand B (multiplier) and then shifting the resultant partial product P(i) to the left by the number of places equal to the position of the digit B(i) in the multiplier. In this particular case it is assumed that the number of places the partial product is to be shifted is directly equal to i. The shifting operation is, in fact, equivalent to the multiplication of the multiplicand by the weight of the decimal (or binary) digit After generating all M partial products, they are then consecutively summed to yield the final (M+K) digit-long final product of A and B. This technique, used for decimal number multiplication is also directly applicable to the principle of binary multiplication of two numbers A and B, their respective binary widths being K and M. The example of multiplication of such 4-bit operands A=1010 and B=0110 is given in Table 1.

TABLE 1

"Paper-and-pencil" multiplication of two 4-bit operands.

| MULTIPLICAND A: | 1 0 1 0 | LSB |
|---|---|---|
| MULTIPLIER B: | 0 1 1 0 | MSB |
| | 0 0 0 0 | partial product 1 |
| | 1 0 1 0 | partial product 2 |
| | 1 0 1 0 | partial product 3 |
| | 0 0 0 0 | partial product 4 |
| | 0 0 0 1 1 1 0 0 | final product |

As in apparent from Table 1 besides some input and output reformatting of the operands and final product, the bulk of multiplication of time, even in its simplest form, is consumed by the M-1 additions required to generate the sum of partial products. In fact, all the algorithmic speed improvements brought into the design of parallel multipliers have involved the reduction of the number of additions necessary to generate the final product, as well as acceleration of the necessary additions (application of "carry-save" adders). The most common techniques used today employ algorithmic refinements of the basic concept described above; they are known as "Wallace Tree Partial Product Reduction" and "Modified Booth Algorithm".

Application of these two techniques combined leads to the potential reduction of the necessary number of partial product additions to one half the number of bits in the multiplier. Consequently, the amount of time necessary for the partial products to flow through the adder array is also cut in half. However, this is accomplished at the expense of using a relatively complex Booth decoder.

Booth algorithms, compared to the present invention, introduces not only extra delays caused by a more complex Booth Decoder, but also results in increased circuit size due to the need of propagating the sign extension through the CSA (Carry Save Adder) array. This also leads to poorer time performance. For example, in Table 1, partial products 1, 2 and 3 would include three, two and one sign extending bits, respectively.

Thus, using the example of Table 1, the Booth multiplication increases generally quadratically with the number of partial products that must be performed, whereas the comb.:national multiplication of Table 1 varies linearly with the number of bits.

The original Booth algorithm and the modified Booth algorithm involve searching for and determining strings of zeros or ones in the multiplier and performing addition and subtraction for the different partial products depending upon a determination of the beginning, end or middle of the string.

In combinatorial multiplication, a relative 1-digit shift always occurs between the multiplicand and the partial sum, regardless of whether an addition has occurred or not. Booth's algorithm permits more than one shift at a time, depending on the grouping of ones and zeros in the multiplier bit by bit, starting with the LSB, shifting the partial product relative to the multiplicand as each bit is examined. Subtract the multiplicand from the partial product when you find the first one in a string of ones. Similarly, upon finding the first zero in a string of zeros, add the multiplicand to the partial product. Perform no operation when the bit examined is identical to the previous multiplier bit.

The logic of Booth's algorithm is as follows: Any binary number comprising a string of ones, such as 111, equals the next larger binary number (1000 in this case) minus 1. Therefore, 111=1000−1; 11=100−1; and so on. In actual multidigit numbers, the beginning and end of each string of ones are marked by transitions from zero to one and one to zero, respectively. In Booth's algorithm, every string of ones in the multiplier is handled by a multiply-subtract operation at the beginning of the string and a multiply-add operation at the end, regardless of the string's length. Thus, the larger the string, the greater the saving if you use the algorithm.

A modified version of Booth's algorithm is more commonly used. The difference between the Booth's and the modified Booth's algorithm is as follows: The modified Booth always generates n/2 independent partial products, whereas the original Booth generates a varying (at most n/2) number dependent of partial products, depending on the bit pattern of the multiplier. Of course, parallel hardware implementation lends itself only to the fixed independent number of partial products. The modified multiplier encoding scheme encodes 2-bit groups and produces five partial products from an 8-bit multiplier, the fifth partial product being a consequence of the fact that the algorithm only handles two's complement numbers (only four partial products are generated if only two's complement representation is used).

Each multiplier is divided into substrings of 3 bits, with adjacent groups sharing a common bit. Booth's algorithm can be used with either unsigned or two's complement numbers, (the most significant bit of which has a weight of $-2^n$), and requires that the multiplier be padded with a 0 to the right to form four complete groups of 3 bits each. To work with unsigned numbers, the n-bit multiplier must also be padded with one or two zeros in the multipliers to the left. Table 2 is the encoding table of the eight permutations of the 3 multiplier bits.

TABLE 2

Encoding the 3 multiplier bits, in the modified Booth's algorithm.

| Bit $2^1$ $Y_{i+1}$ | $2^0$ $Y_i$ | $2^{-1}$ $Y_{i-1}$ | Operation | |
|---|---|---|---|---|
| 0 | 0 | 0 | add zero (no string) | +0 |
| 0 | 0 | 1 | add multiplicand (end of string) | +X |
| 0 | 1 | 0 | add multiplicand (a string) | +X |
| 0 | 1 | 1 | add twice the multiplicand (end of string) | +2X |
| 1 | 0 | 0 | subtract twice the multiplicand (beginning of string) | −2X |
| 1 | 0 | 1 | subtract the multiplicand (−2X and +X) | −X |
| 1 | 1 | 0 | subtract the multiplicand (beginning of string) | −X |
| 1 | 1 | 1 | subtract zero (center of string) | −0 |

Thus, the modified Booth is a series of additions or subtractions depending upon the particular 3 multiplier bit code.

State-of-the-art multipliers, such as those employed in DSP (Digital Signal Processing) architectures, should also be capable of performing accumulation of the products, as well as be capable of operating on both unsigned integers and two's complemented binary words. Also, in the case of more advanced circuits, the addition of both input operands may be required.

Thus, an object of the present invention is to provide a multiplier architecture that possesses all of the above capabilities and matches, if not exceeds, the speed performance of the similar circuits designed around combined Booth algorithm/Wallace tree reduction schemes.

Another object of the present invention is to provide a multiplier architecture which is capable of 4×4, 8×8, 16×16 and other capacities while maintaining the desired speed characteristics.

A still further object of the present invention is to provide a multiplier architecture whose chip size increases almost linearly with the increase of operand widths as compared to quadratic growth in size of Booth architectures.

These and other objects of the invention are attained by a multiplier architecture that reduces the number of partial product additions by performing an unsigned binary multiplication whenever the number of 1's in the multiplier is less than or equal to half the multiplier's binary width and negative or two's complement multiplication of the operands whenever the number of 1's in the multiplier exceeds half of its binary width.

The architecture includes circuitry for determining when to take a two's complement, first and second complementers, a shifter, and an adder. The determining circuit determines and provides a two's complement signal when the multiplier has 1's in more than half of its bits. The first complementer provides a multiplicand vector as a two's complement of the multiplicand in response to the two's complement signal or the multiplicand in the absence of the two's complement signal. The second complementer provides shift control signals as a function of the two's complement of the multiplier in response to the two's complement control signal or as a function of the multiplier in the absence of the two's complement control signal. A shifter circuit provides a plurality of shifted multiplicand vectors as a function of the shift control signals from the second complementer. The adder adds the multiplicand, the multiplier, and the plurality of shifted multiplicand vectors in response to the two's complement signal, or adds only the plurality of shifted multiplicand vectors in the absence of the two's complement signal to produce a product.

The shifter circuit includes a merging circuit for merging bits of the operands with the shifted multiplicand vectors in response to the complement signal. Logic is provided for selecting which bit of which shifted multiplicand vector the bits of the operand are merged as a function of the multiplier. Portions of the bits of the operand are assigned to particular shifted multiplicand vectors and the remaining bits of the operand are assigned by the logic as a function of the multiplier. The adder circuit may include an operand adder to add the operands in parallel with the complementers and provide a portion of the operand sum to be merged with the multiplication vectors and the remainder of the operand bits being provided to a final adder which also receives the shifted multiplicand vectors. Alternatively and preferably in the larger bit operands, one of the operands is merged in the shifters with the other operand being a direct input to the adder circuit.

Carry lookahead at the product or final adder may be performed by logic at the final adder as a function of the plurality of shifted multiplicand vectors or as a function of the multiplicand vectors and shift control signals prepared at the second complementer. Pipelining may also be provided.

Although the structure is built around a 4×4 architecture, this may be expanded in a 4/K architecture wherein K bit long multiplicand A is multiplied in parallel by 4-bit slices of the multiplier and the result in partial vectors are summed in carry-save arrays.

Other objects, advantages and novel features of the present invention will become apparent from the following detailed description of the invention when considered in conjunction with the accompanying drawings.

BRIEF DESCRIPTION OF THE DRAWINGS

FIGS. 13a and 13b are charts of the input and combination of inputs to a 16×16 multiplier according to the principles of the present invention.

DETAILED DESCRIPTION OF THE DRAWINGS

Figure 1:
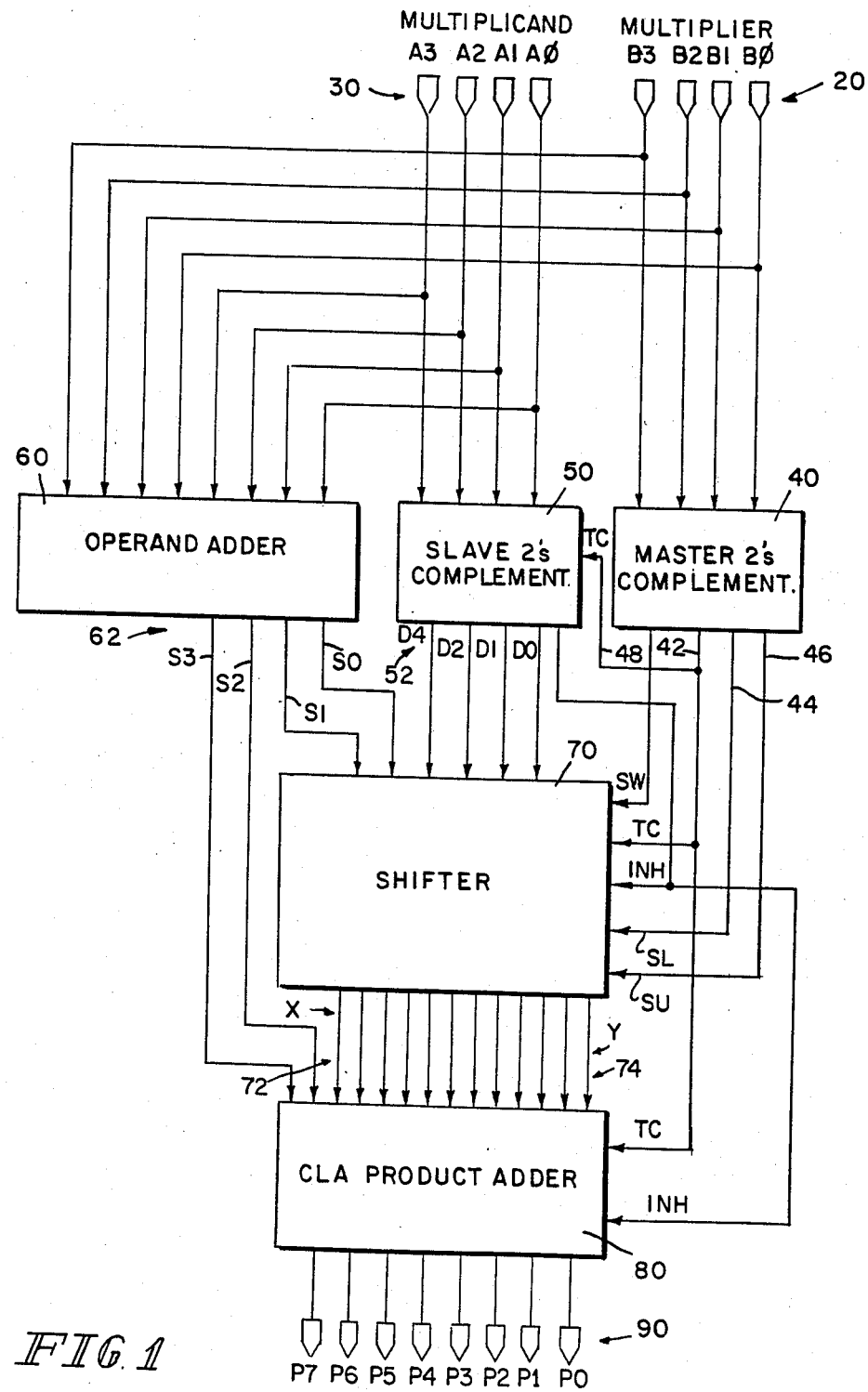
FIG. 1 is a block diagram of a 4×4-bit multiplier according to the principles of the present invention.

The multiplier architecture of the present invention which will be known as Minimal Path Algorithm (MPA) is based on a simple observation that the absolute predictable number of single multiplications necessary to generate the sum of partial products is equal to the number of 1's contained within the multiplier B. In other words, if a 4-bit multiplier B is 1010 (LSB rightmost), the product A*B can be obtained in this case simply by adding the multiplicand A, say 1101, to itself shifted by two places to the left to produce a product of 110110. Unfortunately, the number of 1's or (0's) in the multiplier cannot be determined in advance; therefore the adder array has to be "prepared" for the worst case condition (i.e. multiplier equal to 1111) and, consequently three consecutive addition must be performed even if no reduction scheme is used. Moreover, if the multiplication involves negative (two's complement) numbers the product must be reformatted to its either positive or negative form requiring an extra addition.

By controlling the representation of the multiplier bits such that the multiplier would never contain more 1's than half the number of its bits, the number of necessary additions required to perform the multiplication could be reduced by half. In particular, in the case of 4-bit multiplication, only a single addition would be required. This is achieved by using the two's complement representation of unsigned binary numbers which originally contained more 1's than half of their total number of bits. Thus by verification of the number of 1's in the multiplier, the multiplier's representation may be controlled so that the number of 1's contained in it is always equal to or less than half of its binary width.

The MPA architecture of the present invention allows the reduction of the number of partial products additions by performing an unsigned binary multiplication whenever the number of 1's width, in multiplier is less than or equal to half the multiplier's binary width, and two's complement multiplication of the operands whenever the number of 1's in the multiplier exceeds half of its binary width. Since the product of two two's complemented operands can be represented as:

$$P = (2^K - A)*(2^M - B) = 2^{K+M} - 2^K*B - 2^M*A + A*B \quad (1)$$

where K and M are the respective binary widths of multiplicand A and multiplier B.

Thus, if the two's complement multiplication took place, the unsigned (or positive) product or A and B is obtained as:

$$A*B = P + 2^K*B + 2^M*A \quad (2)$$

with the overflow term $2^{K+M}$ discarded, since it exceeds the system representation range $0 \ldots 2^{K+M} - 1$.

Application of the Minimal Path Algorithm to 16×16 bit multiplier architecture leads to the occurrence of a specific arithmetic overflow condition called Local Overflow This condition occurs when any of the 4-bit multiplier slices B[K,K+4] requires that the multiplicand A be two's complemented. In such a case the addition of two shifted partial vectors will generate a single 1 overflow beyond the local range of the multiplication. In other words, a multiplication of a 4-bit multiplier slice and 16-bit two's complemented multiplicand will result in the correct partial vector with bits A(0)...A(19) plus an overflow 1 in the bit position A(20).

In order to alleviate the error caused by these local overflows 4-bit offset words are added to bit positions A[20:23], A[24:27] and A[28:31] of the partial vectors whenever two's complementation of any of the four partial vectors is required. The addition and values of the offset words are dependent on the pattern of the three TC signals TC0, TC1 and TC2 indicating which of the first three partial vectors are two's complemented. Table 3 below lists the truth table indicating the values of the offset bits B[31:20] for all eight patterns of the TC signals.

TABLE 3

| TC2 | TC1 | TC0 | B31 | B30 | B29 | B28 | B27 | B26 | B25 | B24 | B23 | B22 | B21 | B20 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 1 | 1 | 1 |
| 0 | 1 | 0 | 1 | 1 | 1 | 1 | 1 | 1 | 1 | 1 | 0 | 0 | 0 | 0 |
| 0 | 1 | 1 | 1 | 1 | 1 | 1 | 1 | 1 | 1 | 0 | 1 | 1 | 1 | 1 |
| 1 | 0 | 0 | 1 | 1 | 1 | 1 | 0 | 0 | 0 | 0 | 0 | 0 | 0 | 0 |
| 1 | 0 | 1 | 1 | 1 | 1 | 0 | 1 | 1 | 1 | 1 | 1 | 1 | 1 | 1 |
| 1 | 1 | 0 | 1 | 1 | 1 | 0 | 1 | 1 | 1 | 1 | 0 | 0 | 0 | 0 |
| 1 | 1 | 1 | 1 | 1 | 1 | 0 | 1 | 1 | 1 | 0 | 1 | 1 | 1 | 1 |

The set of corresponding logic equations for each bit are:

$$B31 = B30 = B29 = TC0 + TC1 + TC2$$

$$B28 = TC2 :+: (TC1 + TC0) = /(TC2 :+: /(TC1 + TC0))$$

$$B27 = B26 = B25 = TC1 + TC0$$

$$B24 = TC1 :+: TC0$$

$$B23 = B22 = B21 = B20 = TC0$$

where :+: indicates EXCLUSIVE-OR operator.

The overflow detection and offset is also used in 8×8 or any architecture using multiplier slices.

Although the conversion of the two's complemented product to the unsigned format implies the necessity to perform an extra addition, as it will be seen further, such an addition does not contribute to the regular multiplication time, as it can be performed in parallel with the MPA encoding.

As it can be concluded from the equation (2), a binary multiplication of two 4-bit operands will require only a single level of 8-bit carry lookahead addition, since the multiplier will never cause generation of more than two partial products. In this case the formula (2) is reduced to:

$$A*B = P + 2^4*(A + B) \quad (3)$$

The second term in equation (3) corresponds to the sum of input operands shifted four places to the left and then added to the product of two's complemented operands A parallel 4-bit addition of the operands A and B is performed during the MPA encoding and its sum is implanted in the partial products using the MPA reduction described below.

Figure 2:
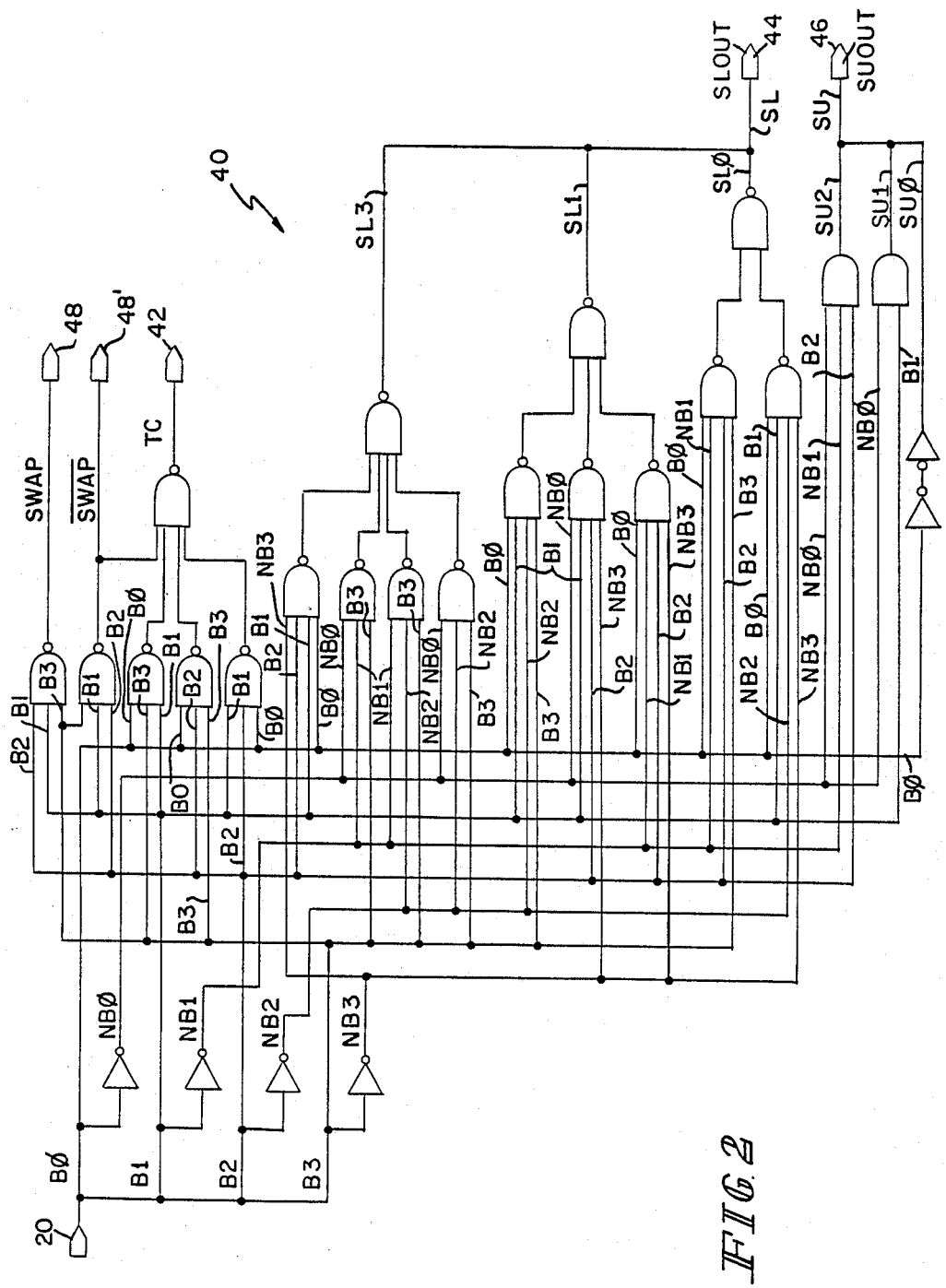
FIG. 2 is a logic diagram of a master two's complementer and encoder of FIG. 1.
Figure 3:
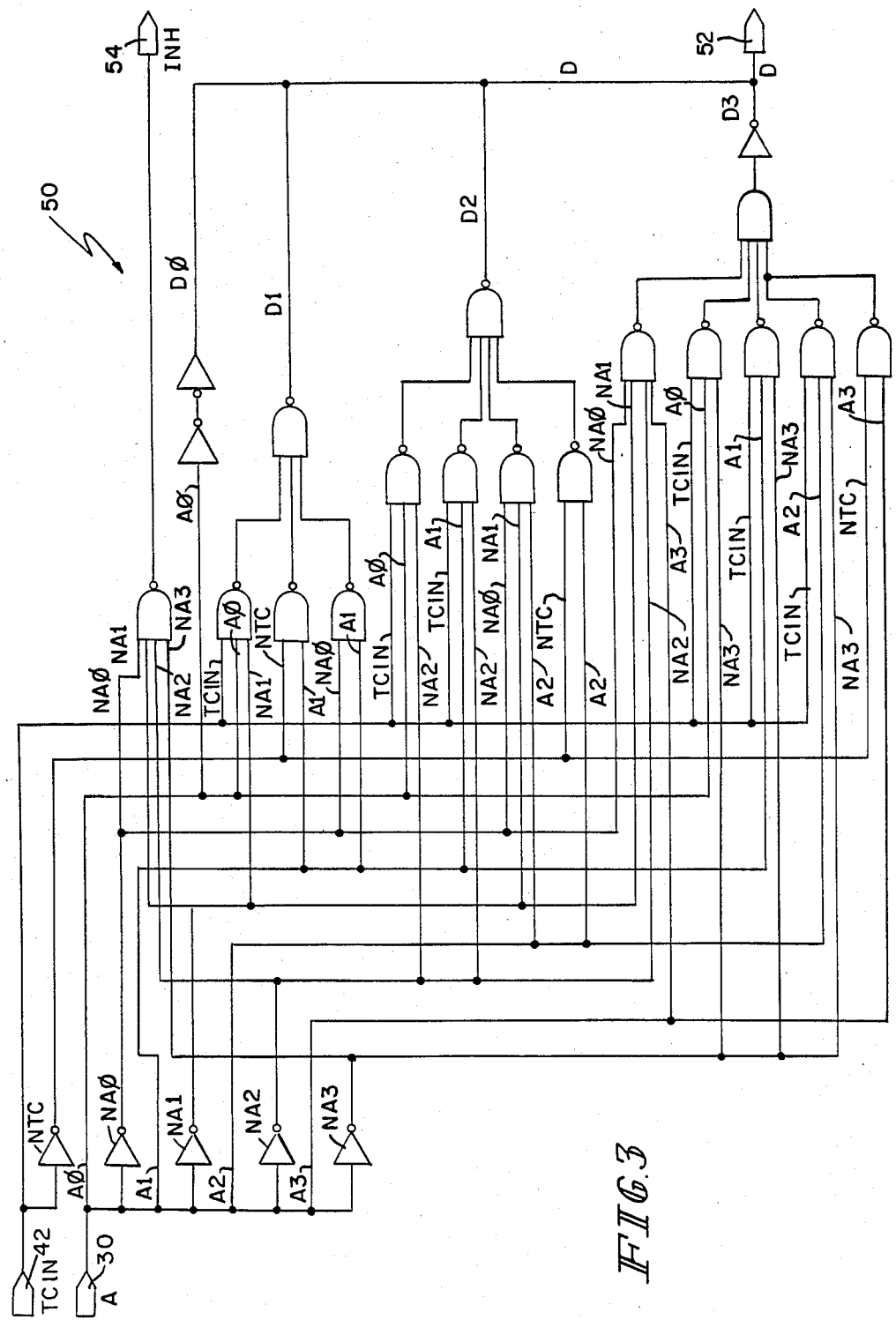
FIG. 3 is a logic diagram of a slave two's complementer of FIG. 1.
Figure 4:
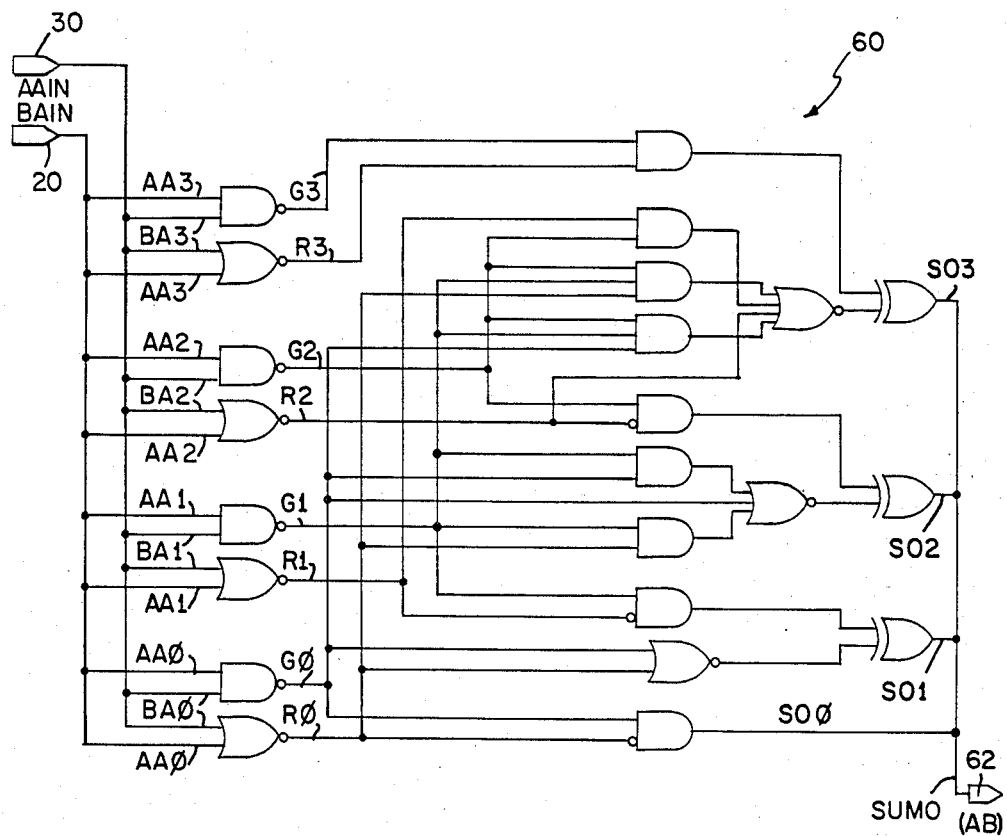
FIG. 4 is a logic diagram of an operand adder of FIG. 1.

The principles of the present invention will be illustrated by its application to a 4×4, an 8×8 and a 16×16-bit multiplier. FIG. 1 illustrates a 4×4-bit multiplier having an input 20 for a 4-bit multiplier B0 through B3 and an input 30 for a 4-bit multiplicand A0 through A3. Inputs for the multiplier and the multiplicand 20, 30 are connected respectively to a Master Two's Complementer (MTC) 40 and a Slave Two's Complementer (STC) 50 as well as both being provided to an operand adder 60. Logic circuits for MTC 40, STC 50 and operand adder 60 are illustrated in FIGS. 2, 3 and 4, respectively. Control bits from the MTC 40 are provided to the STC 50, a shifter 70 and a product adder 80. The output of the STC 50 is also provided to the shifter 70. FIG. 5 shows the logic diagram of the shifter 70 for FIG. 1. The output of the operand adder 60 is provided to the shifter 70 and the product adder 80. The output 90 of the product adder 80 is an 8-bit product P0 through P7.

The MTC 40 determines when the number of 1's of the multiplier B exceeds half the width of the multiplier and provides a two's complement signal TC on output 42 to the STC 50 to force two's complementation of the multiplier A. The signal TC is also provided to the shifter 70 and product adder 80 to control the addition of the operand's sum from operand adder 60 to the partial product from STC 50. The MTC 40 also generates multiplicand vector control bits SL and SU at outputs 44 and 46 and provides them to the shifter 70. A swap control bit at output 48 of the MTC 40 is provided to the shifter 70 to control placement of a bit from the operand adder 60 into one of the multiplicand vectors in shifter 70.

The MPA map of Table 4 shows the relationship between the input multiplier bits B0 through B3, the two's complemented multiplier bits BC0 through BC3, the two's complemented control signal TC, the swap signal and the shifter control signals SL0 through SL2 and SU0 through SU2. From this map, the equations for the shifter control bits of Table 5 are derived and implemented in FIG. 2.

TABLE 4
MPA Map.

| Multiplier Bits | | | | Two's Complemented Bits | | | | Shifter Control Bits | | | | | | |
|---|---|---|---|---|---|---|---|---|---|---|---|---|---|---|
| B3 | B2 | B1 | B0 | BC3 | BC2 | BC1 | BC0 | TC | SWAP | SU0 | SU1 | SU2 | SL0 | SL1 | SL2 |
| 0 | 0 | 0 | 0 | | | | | 0 | 0 | 0 | 0 | 0 | 0 | 0 | 0 |
| 0 | 0 | 0 | 1 | | | | | 0 | 0 | 1 | 0 | 0 | 0 | 0 | 0 |
| 0 | 0 | 1 | 0 | | | | | 0 | 0 | 0 | 1 | 0 | 0 | 0 | 0 |
| 0 | 0 | 1 | 1 | | | | | 0 | 0 | 1 | 0 | 0 | 1 | 0 | 0 |
| 0 | 1 | 0 | 0 | | | | | 0 | 0 | 0 | 0 | 1 | 0 | 0 | 0 |
| 0 | 1 | 0 | 1 | | | | | 0 | 0 | 1 | 0 | 0 | 0 | 1 | 0 |
| 0 | 1 | 1 | 0 | | | | | 0 | 0 | 0 | 1 | 0 | 0 | 1 | 0 |
| 0 | 1 | 1 | 1 | 1 | 0 | 0 | 1 | 1 | 0 | 1 | 0 | 0 | 0 | 0 | 1 |
| 1 | 0 | 0 | 0 | | | | | 0 | 0 | 0 | 0 | 0 | 0 | 0 | 1 |
| 1 | 0 | 0 | 1 | | | | | 0 | 0 | 1 | 0 | 0 | 0 | 0 | 1 |
| 1 | 0 | 1 | 0 | | | | | 0 | 0 | 0 | 1 | 0 | 0 | 0 | 1 |
| 1 | 0 | 1 | 1 | 0 | 1 | 0 | 1 | 1 | 0 | 1 | 0 | 0 | 0 | 1 | 0 |
| 1 | 1 | 0 | 0 | | | | | 0 | 0 | 0 | 0 | 1 | 0 | 0 | 1 |
| 1 | 1 | 0 | 1 | 0 | 0 | 1 | 1 | 1 | 0 | 1 | 0 | 0 | 1 | 0 | 0 |
| 1 | 1 | 1 | 0 | 0 | 0 | 1 | 0 | 1 | 1 | 0 | 1 | 0 | 0 | 0 | 0 |
| 1 | 1 | 1 | 1 | 0 | 0 | 0 | 1 | 1 | 1 | 1 | 0 | 0 | 0 | 0 | 0 |

TABLE 5
Equation for Shifter Control Bits.

$TC = B0*B1*B2 + B0*B1*B3 + B0*B2*B3 + B1*B2*B3$ $SWAP = B1*B2*B3$ $SU0 = B0$ $SU1 = \overline{B0}*B1$ $SU2 = \overline{B0}*\overline{B1}*B2$ $SL0 = B0*B1*\overline{B2}*\overline{B3} + B0*\overline{B1}*B2*B3$ $SL1 = B0*\overline{B1}*B2*\overline{B3} + \overline{B0}*B1*B2*\overline{B3} + B0*B1*\overline{B2}*B3$ $SL2 = \overline{B0}*\overline{B1}*B3 + \overline{B0}*\overline{B2}*B3 + \overline{B1}*\overline{B2}*B3 + B0*B1*B2*\overline{B3}$ The STC so provides multiplicand vectors D0 through D4 at its output 52. An equation set for the 4-bit and 8-bit STC 50 are provided for in Table 6 with the 4-bit STC 50 being implemented in FIG. 3.

TABLE 6
Equation Set for 4-Bit and 8-Bit Slave Two's Complementer.

D0 = A0

D1 = A1 :+: TC*A0 =

= $\overline{A0}*A1 + A1*\overline{ATC} + A0*\overline{A1}*TC$

D2 = A2 :+: [TC*(A0 + A1)] =

= $\overline{A0}*\overline{A1}*A2 + A2*\overline{TC} + A1*\overline{A2}*TC + A0*\overline{A2}*TC$

D3 = A3 :+: [TC*(A0 + A1 + A2)] =

= $\overline{A0}*\overline{A1}*\overline{A2}*A3 + A3*\overline{TC} + A2*\overline{A3}*TC + A1*\overline{A3}*TC + A0*\overline{A3}*TC$

D4 = A4 :+: [TC*(A0 + A1 + A2 + A3)]

D5 = A5 :+: [TC*(A0 + A1 + A2 + A3 + A4)]

D6 = A6 :+: [TC*(A0 + A1 + A2 + A3 + A4 + A5)]

D7 = A7 :+: [TC*(A0 + A1 + A2 + A3 + A4 + A5 + A6)]

INH = A0 + A1 + A2 + A3     (4-BIT)

INH = A0 + A1 + A2 + A3 + A4 + A5 + A6 + A7     (8-BIT)

Remarks:
1. :+: designates the EXCLUSIVE OR operator.
2. Only the first four bits D[0:3] are used in their two-level expanded form.

The multiplicand vector D0 through D4 is either the multiplicand A0 through A3 or its two's complement as determined by the two's complement control bit TC received from the MTC 40. The STC 50 also generates an inhibit control bit INH at output 54 to block the addition for the multiplicand being a zero and provides the inhibit signal to the shifter 70 and the product adder 80.

The operand adder 60 receives inputs of the multiplier B and the multiplicand A and provides a summed output S0 through S3 at output 62. The less significant two bits S0 and S1 are provided to the shifter 70 and the most significant two bits S2 and S3 are provided to the product adder 80.

The shifter 70 receives the multiplicand vector D0 through D4 from the STC 50 and under the control of control bits from the MTC 40 and the STC 50 forms two shifted multiplicand vectors, shifted under the control of the control bits SL and SU from the MTC 40. The two least significant bits S0 and S1 from the operand adder 60 are provided to the shifter 70 and are merged into the shifted output vectors under the control of the swap and two's complement control TC from the MTC 40. The shifter 70 provides output vectors X and Y at outputs 72 and 74 to the product adder 80. Since the shifted multiplicand vector includes the least significant bits from the operand adder, they are not true partial products.

Figure 5A:
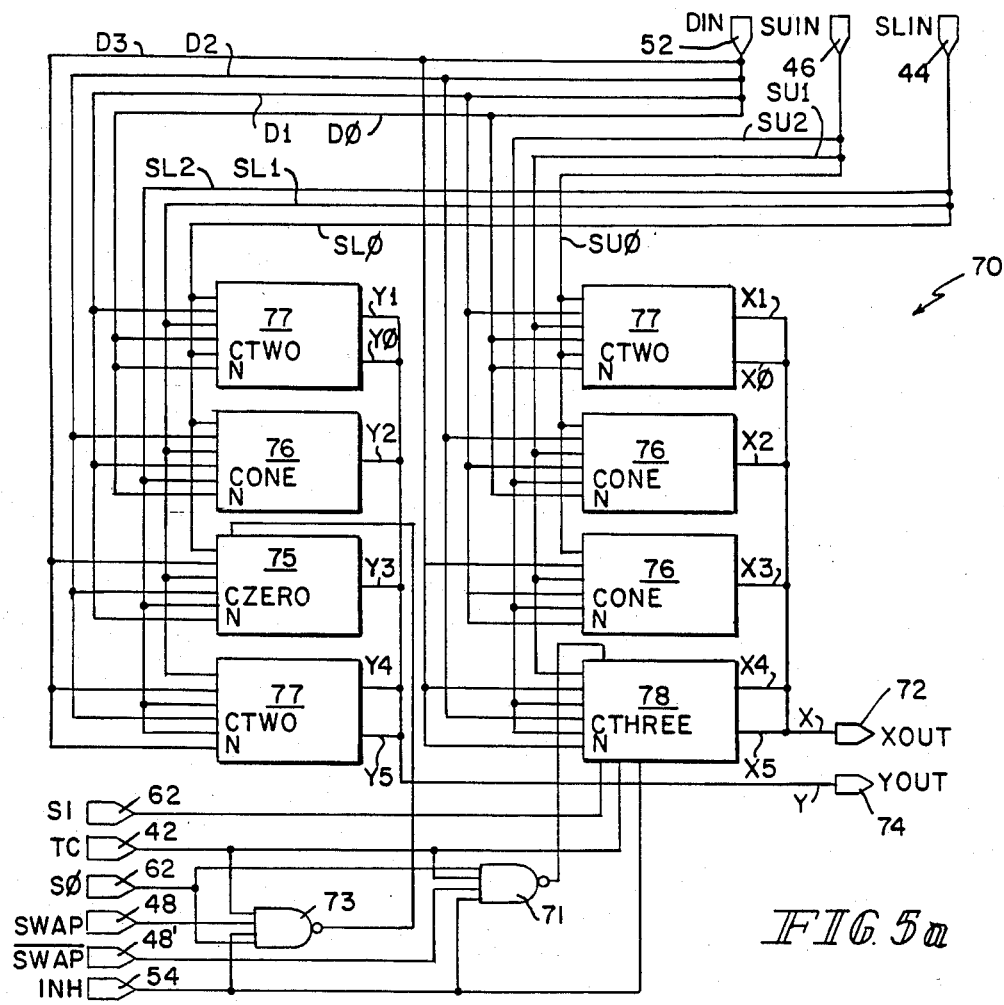
FIGS. 5a, 5b, 5c, 5d and 5e are logic diagrams of a shifter of FIG. 1.
Figures 5B, 5D:
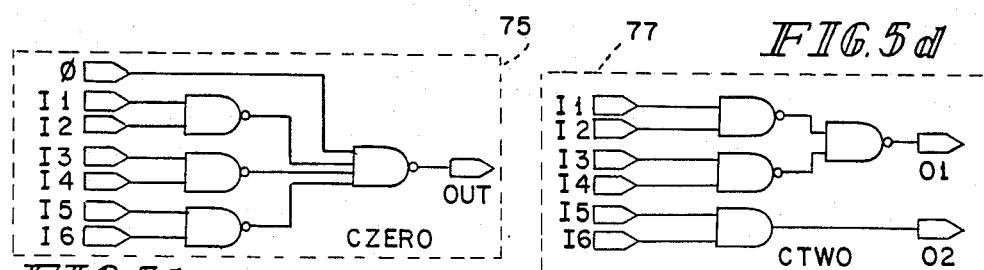
Figures 5C, 5E:
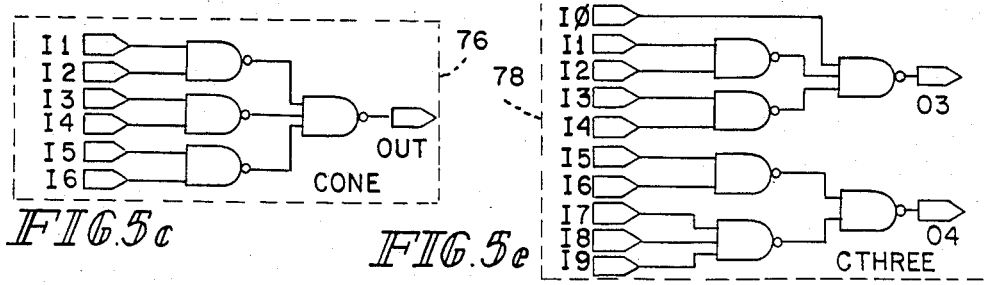

As illustrated in FIG. 5a, the control signals TC, swap and inhibit are combined with the least significant bit S0 from the operand adder 60 in AND-gates 71 and 73 and are provided to the logic for the X4 and Y3 shifted vectors. Only one of the vectors will receive the S0 as a function of the control logic. The specific logic for the shifter elements 75 through 78 are illustrated in FIGS. 5b–5e respectively. The logic of FIG. 5 is an implementation of the equations of Table 7.

TABLE 7

4-Bit MPA Multiplier: Equation Set for Shifted Vectors.

X0 = SU0*A0
X1 = SU0*D1 + SU1*A0
X2 = SU0*D2 + SU1*D1 + SU2*A0
X3 = SU0*D3 + SU1*D2 + SU2*D1
X4 = SU1*D3 + SU2*D2 + $\overline{SWAP}$*TC*S0*INH
X5 = SU2*D3 + TC*S1
Y0 = SL0*A0
Y1 = SL0*D1 + SL1*D0
Y2 = SL0*D2 + SL1*D1 + SL2*A0
Y3 = SL0*D3 + SL1*D2 + SL2*D1 + SWAP*TC*S0*INH
Y4 = SL1*D3 + SL2*D2
Y5 = SL2*D3 where: D[0:3] is the output from STC and S0 and S1 are the first two sum bits from 4-bit operational adder.

The product adder 80 receives the shifted multiplicand vectors X and Y from the shifter 70 and the two most significant bits S2 and S3 from the operand adder 60. Under the control of control bits TC and inhibit from MTC 40 and the STC 50 respectively, the product adder adds the vectors X and Y and the upper two bits of the operand sum to produce the output product P0 through P8.

The adder 80 in absence of the two's complement control bit TC adds only the shifted vectors X and Y which represent the multiplier A0 through A3. With the presence of a two's complement control bit TC, the product adder adds the shifted vectors X and Y which represent the two's complement of the multiplicand A0 through A3 and includes the least significant bits S0 and S1 from the operand adder 60 with the most significant bits S2 and S3 of the operand adder 60 in producing the product. Thus, equation (3) above is only used when two's complement multiplication is being performed.

Figure 6:
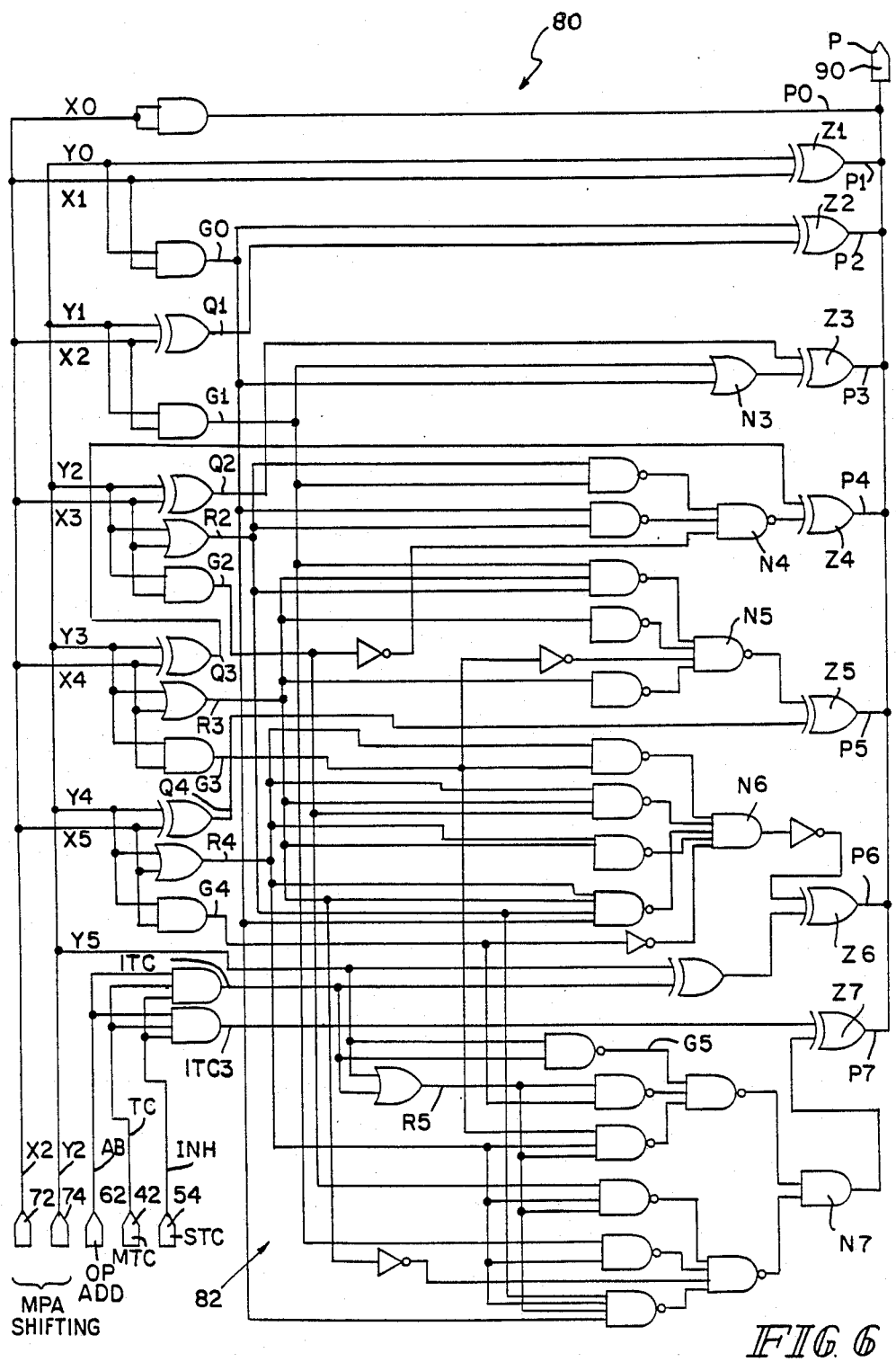
FIG. 6 is a logic diagram of a product adder with carry lookahead.

A logic diagram of the product adder 80 is illustrated in FIG. 6. Carry lookahead logic 82 is connected to the output OR-gates Z4 through Z7. In addition, the two's complement control and the most significant bits S2 and S3 from the operand adder 60 are connected to output OR-gates Z6 and Z7. Thus, the carry lookahead logic of the product adder 80 is responsive to the input vectors X and Y from the shifter 70.

The output of the shifter 72 and 74 are two six-bit vectors X and Y as illustrated in Table 8, the six-bit vector X and Y are shifted by one place and are capable of performing the shifting for any multiplier B. The shifted operand sum S0 through S3 is also illustrated with respect to the vectors X and Y and the relationship of all three to the final output product P0 through P7 are also illustrated.

TABLE 8

| Shifted Operand Sum | S3 | S2 | S1 | S0 | | | | |
|---|---|---|---|---|---|---|---|---|
| Vector X | | | | | X5 | X4 | X3 | X2 | X1 | X0 |
| Vector Y | | | Y5 | Y4 | Y3 | Y2 | Y1 | Y0 | |
| Output Product Bits | P7 | P6 | P5 | P4 | P3 | P2 | P1 | P0 |

Analysis of Tables 4 and 8 will illustrate the efficiency of the present multiplier architecture wherein the addition of the operands is in parallel with the two's complement operation to minimize time and the placement of the bits of the output of the operand adder requires only a single addition at the product adder and thereby eliminates a carry-save stage through the architecture.

Since the product adder 80 is capable of full 8-bit carry lookahead addition, the operand adder bits S2 and S3 can be directly inserted into the additional positions X6 and X7 of the vector X. A review of the MPA map of Table 4 reveals that when the two's complement signal TC is a "1", SU2 is always a "0". Since SU2 would shift the vector D0 through D4 from the STC 50 two positions to the left in the X register, it being a zero would mean that X5 is always empty when TC is a "1". Thus, the summed bit S1 can be inserted in the X5 position. It should be noted that if TC is a zero, S0 through S3 are not added to the shifted vectors X and Y and therefore, the formulas in Table 7 which deal with the S1 and S0 bits are all tied to the logic signal TC. These are the five two's complemented signals of Table 4.

A further analysis of the MPA map of Table 4 indicates that for the last two TC signals of the table, wherein the input B0 through B3 are "1110" and "1111", only SU1 is a "1" and only SU0 is a "1", respectively. Thus, the Y vector is empty or completely free. For the other three two's complemented signal, namely "0111", "1011" and "1101", SU0 is a "1" and thus the position X4 and X5 are vacant. Thus, the least significant S0 of the operand sum may be placed in the vector Y3 for the last two complemented signals in Table 4 since there is no Y vector and places in the X vector at position X4 for the other three conditions. This is under the control of the Swap signal which monitors the coincidence occurrence of B1, B2 and B3 in the multiplier B as indicated in Tables 4 and 5.

Thus it can be seen that the sum of the two operands can be generated in parallel with the two's complements encoding and merged in the vectors X and Y such that there is a single addition in the product adder. The structure which alleviates carry-save stages is implemented using eight or nine levels of logic excluding the input output buffers. These include two levels of logic in the two's complement circuits 40, 50 and three levels of logics in the operand circuit 60, three levels of logic in the shifter 70 and three levels of logic in the carry lookahead product adder 80. Since the two's complement circuits 40 and 50 and the operand adder 60 are in parallel, they are effectively two or three levels of logic added to the six levels of logic from the shifter 70 and the product adder 80.

To increase the speed of the architecture of FIGS. 2 through 6, the delays attributed to the carry lookahead circuitry of the product adder 80 of FIG. 6 are reduced. The reduction results from doing a deep carry lookahead since the values of the shifted multiplicand vectors are determined several logic levels earlier. Thus, the carries to the output bits P4 through P7 can be delivered almost at the same time as the vectors X and Y to the product adder 80.

Figure 7:
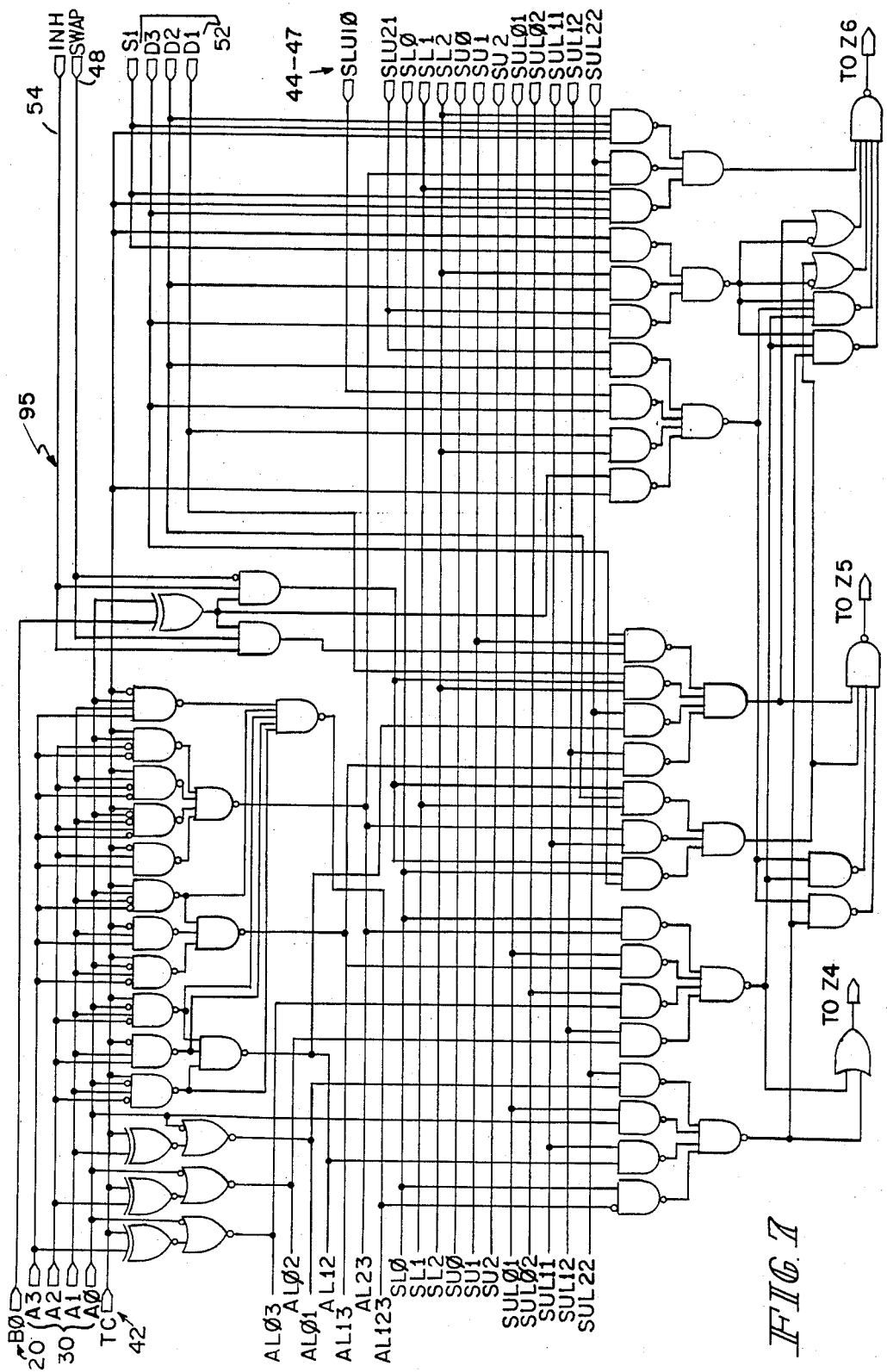
FIG. 7 is a logic diagram of a modified carry lookahead circuit.

An implementation of the deep carry lookahead circuit 95 is illustrated in FIG. 7. It receives the least significant bit B0 of the multiplier B from input 20, the multiplicand input A0 through A4 from input 30 and the bits D1 through D3 from the output of the STC 50. The two's complement signal TC and swap signal from outputs 42 and 48 respectively of the MTC 40 are also provided to the deep carry lookahead circuit 95. The inhibit control bit from output 54 of the STC 50 is also inputted. The shift control bits SL and SU at outputs 44 and 46 from the MTC 40 are provided with additionally generated logics 45 and 47 to be explained with reference to FIG. 8. The deep carry lookahead 95 of FIG. 7 produces control signals to be provided to the output OR-gates Z4, Z5 and Z6 of product terms P4, P5 and P6 of the product adder 80.

Figure 8:
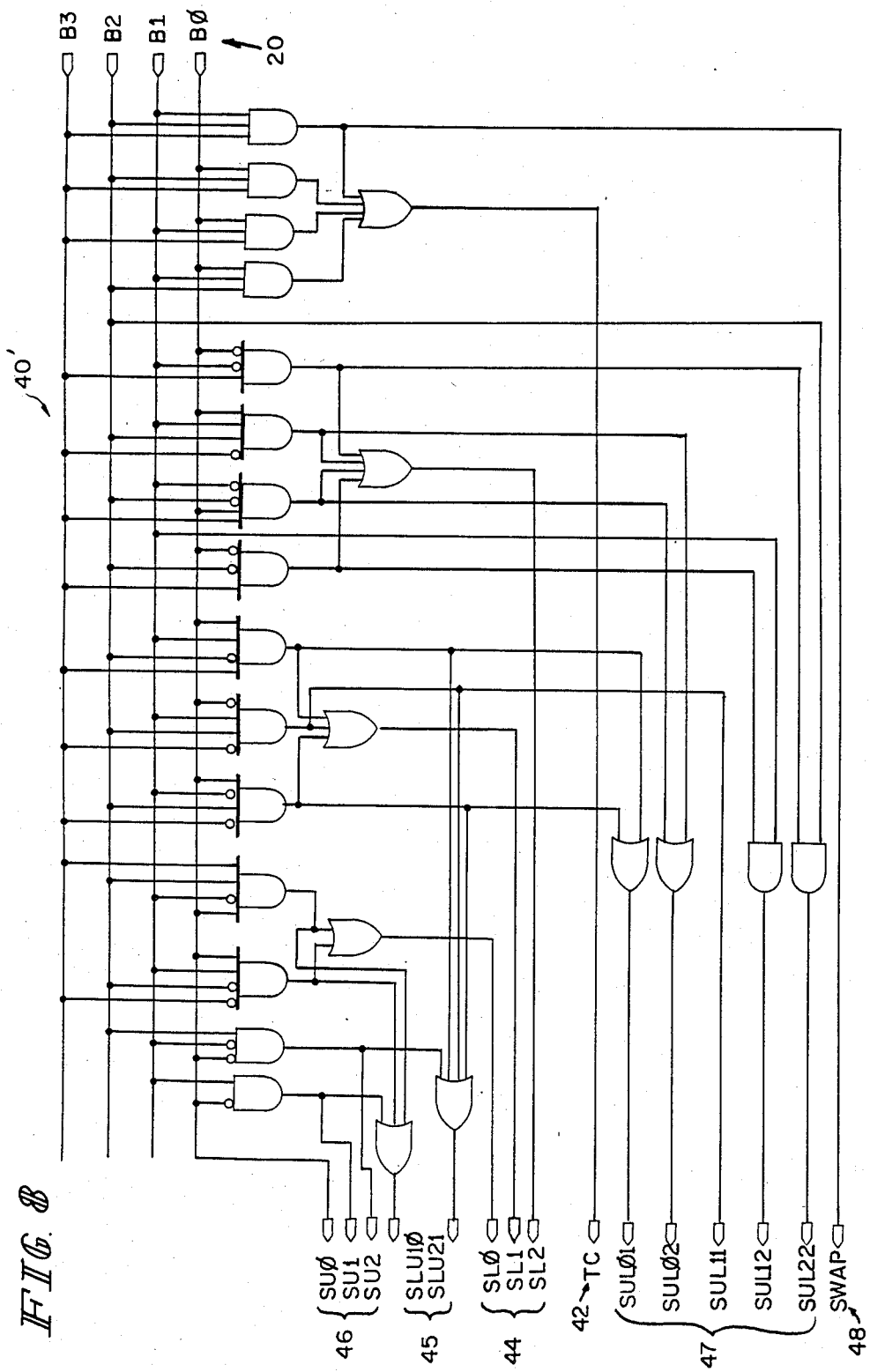
FIG. 8 is a logic diagram of the master two's complementer for use with the modified carry lookahead circuit of FIG. 7.
Figure 9:
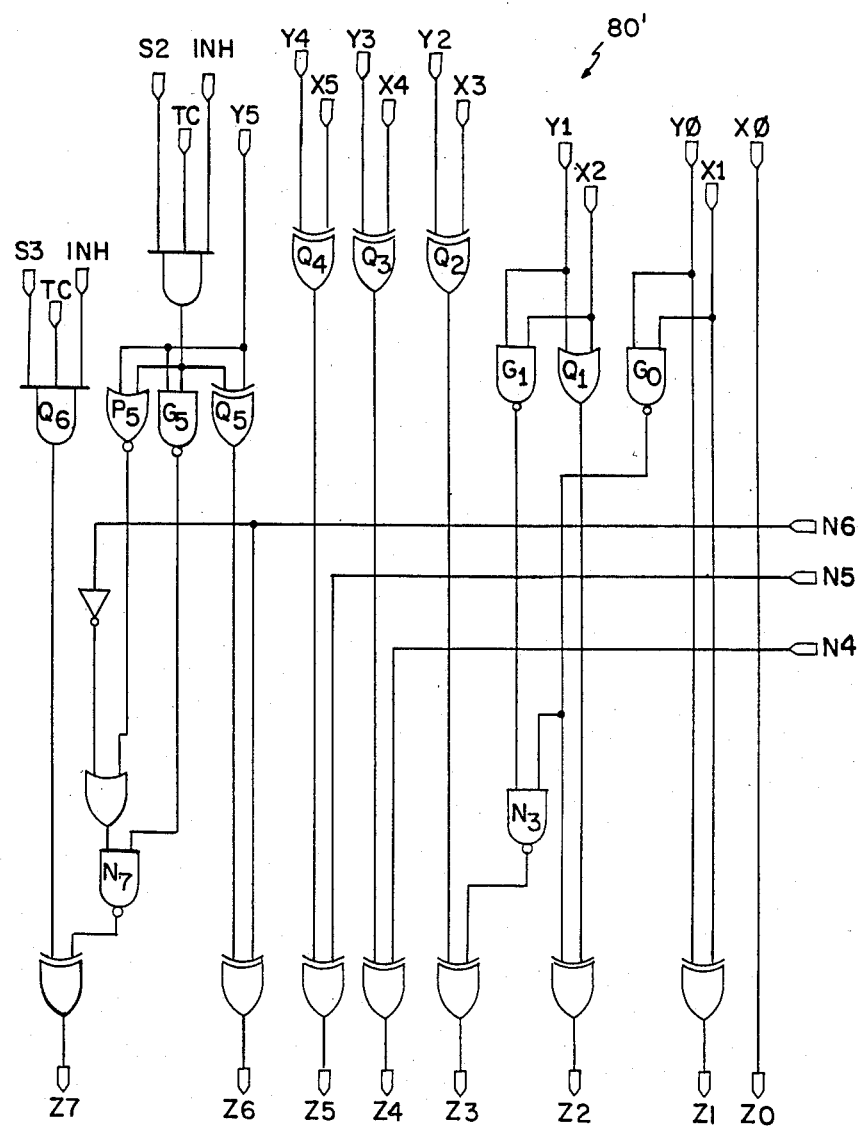
FIG. 9 is a logic diagram of a final adder for use with the modified carry lookahead circuit of FIG. 7.

The modified MTC 40', as illustrated in FIG. 8, in addition to the logic previously illustrated in FIG. 2, includes the filled-in logic gates which produce two OR signals SLU at output 45 and five AND signals SUL at outputs 47. The complexity of the product adder 80' as illustrated in FIG. 9 is reduced compared to FIG. 6. Although the overall circuitry of FIGS. 7, 8 and 9 includes more logic gates, the speed is increased by approximately 15 to 20 percent. The deep carry lookahead circuit 95 basically is in parallel to the shifter 70 so as to perform calculations at the same time that the shifter 70 is producing the vectors X and Y.

Figure 10:
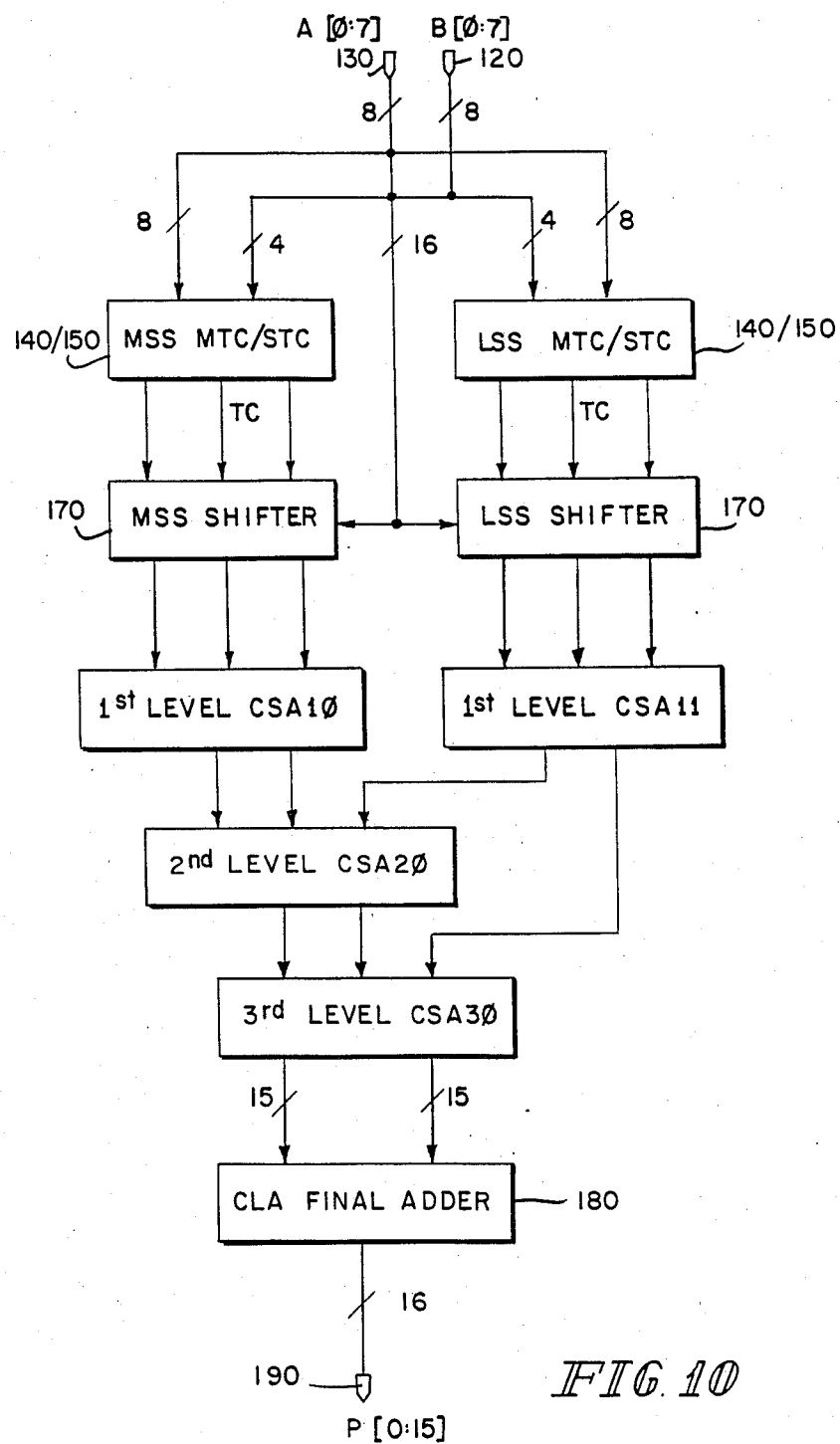
FIG. 10 is a block diagram of an 8×8 multiplier incorporating the principles of the present invention.

The application of the present invention to an 8×8-bit multiplier is illustrated in FIG. 10 using a 4/K architecture. This is where a 8-bit long multiplicand A is multiplied in parallel by 4-bit slices of the multiplier B and the resultant vectors are summed in a carry-save array or tree. This method preserves a multiplication through single addition concept of the present invention. Although the 4/K architecture is shown, the present invention may also be implemented using a full 8-bit wide architecture with an 8-bit wide two's complement TC signal generation. Also, it may be implemented using a full 4-bit slice matrix where four separate parallel multiplications are performed on 4-bit slices of the multiplicand and multiplier.

The 8-bit multiplier B and the 8-bit multiplicand A are provided on inputs 120 and 130 respectively. Two sets of 8-bit wide MTC, STC and shifter circuits are employed for the most significant slice (MSS) and least significant slice (LSS). The LSS circuit multiplies the 8-bit multiplicand A by the least significant 4 bits of the multiplier B and the MMS circuit multiplies the 8-bit multiplicand A by the most significant 4 bits of the multiplier B. The MTC and STC are shown as a single box 140/150 and the shifter is shown as a circuit 170. As will be explained below, the function of the operand adder 60 is performed in the shifter 170. The shifter 170 receives shift control signals from its respective MTC and STC as well as 8-bit multiplicand vectors. The shifters 170 also receive the operands A and B to perform the operand addition. As will be discussed more fully below, the LSS shifter has three output vectors AL, X, Y while the MSS shifter provides the three output vectors AH, V, W. The first level carry-save adders CSA10 and CSA11 add two of their respective input vectors and provides that as an output as well as adding the save from the first addition to the third vector. The two outputs from CSA10 are added with one of the outputs of CSA11 in the second level carry-save adder CSA20. The two outputs from CSA20 are added with the second output of CSA11 in a third level carry-save adder CSA30. The two outputs of the third level CSA30 are added in the final adder with carry lookahead 180 to provide the 16-bit output product P0 through P15 at output 190. The vectors X, Y, V and W are 10-bit wide to accommodate the shifting of the multiplicands using the scheme o Table 7.

By multiplying the multiplicand A by the four least significant bits BL of the multiplier B and separately multiplying the multiplicand A by the four most significant bits BM of the multiplier B, the equation (2) for the two's complement multiplication for each multiplication are expressed as follows:

$$A*BL = P_L + 2^{4}*A + 2^{8}*BL \qquad (4)$$

$$A*BH = P_H = 2^{4}*A + 2^{8}BH \qquad (5)$$

Figure 11A:
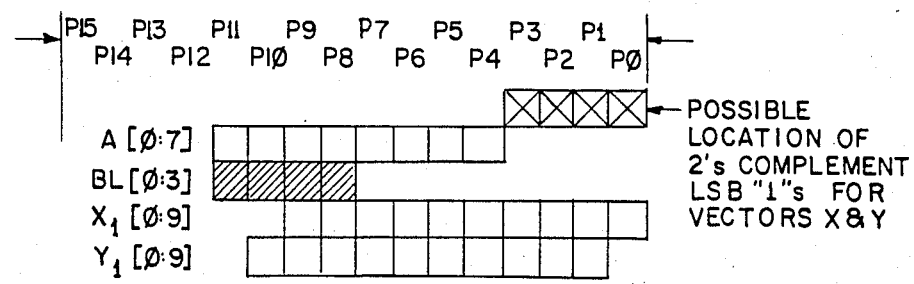
FIGS. 11a and 11b are charts of the input and combination of inputs produced by the two's complementer and shifter of FIG. 10 for an 8×8 multiplier according to the principles of the present invention.
Figure 11A:
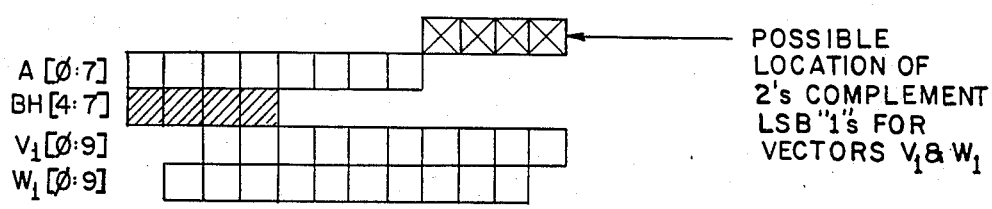

A representation of these equations shifted to the appropriate position relative to the 16-bit output product P0 through P15 are illustrated in FIG. 11a.

In order to reduce the complexity of the STC 150, a different method of implementing two's complementation is provided. This method involves a single bit-by-bit complementation of all the bits of the multiplicand A and then the addition of "1" to A's least significant bit. The addition of the "1" at the least significant bit may be carried out at any stage in the multiplication ladder. The "1" to be added will be known as the extra LSB bits. Thus, the STC 150 consists of single level exclusive OR array under the control of the two's complement control bit TC. The extra LSB bits are shown in FIG. 11a as the boxes with the X's. Two of the four boxes will have a "1" therein depending upon the position of the vectors X, Y and V, W.

Figure 11B:
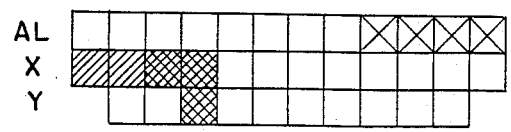
Figure 11B:
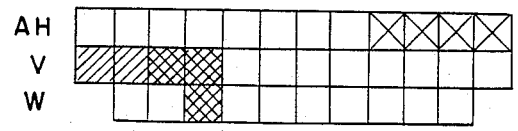

Returning to FIG. 11a, the shifting of the operand A four places, allows the extra LSB 1's to be combined with the operand A to provide one of the output vectors AL and AH respectively of the pair of shifters 170 as illustrated in FIG. 11b. The four bits of the multiplier B to be added to the X, Y and V, W vectors are merged therewith using the same rules as those described for the 4-bit output of the operand adder 40 of FIG. 1. The two most significant bits of BL/BH are provided in the X or V vector in the empty space. The second least significant bit of BL/BH is provided in the tenth position of the Y, or V vector if the two's complement control signal is "1". The least significant bit of the BL/BH is provided in the X8/V8 or Y7/W7 position depending upon the swap control signal. The resulting three vectors as a merging of the four inputs are illustrated in FIG. 11b.

As in the 4×4 architecture, the 8×8 may be optimized for speed performance by using deep carry lookahead circuitry and the application of pipeline latches at least two levels of the logic. Furthermore, the output carry lookahead adder 180 may be substituted by a single level of carry-save adder resulting in a simpler and topographically more consistent architecture of the adder array.

Figure 12:
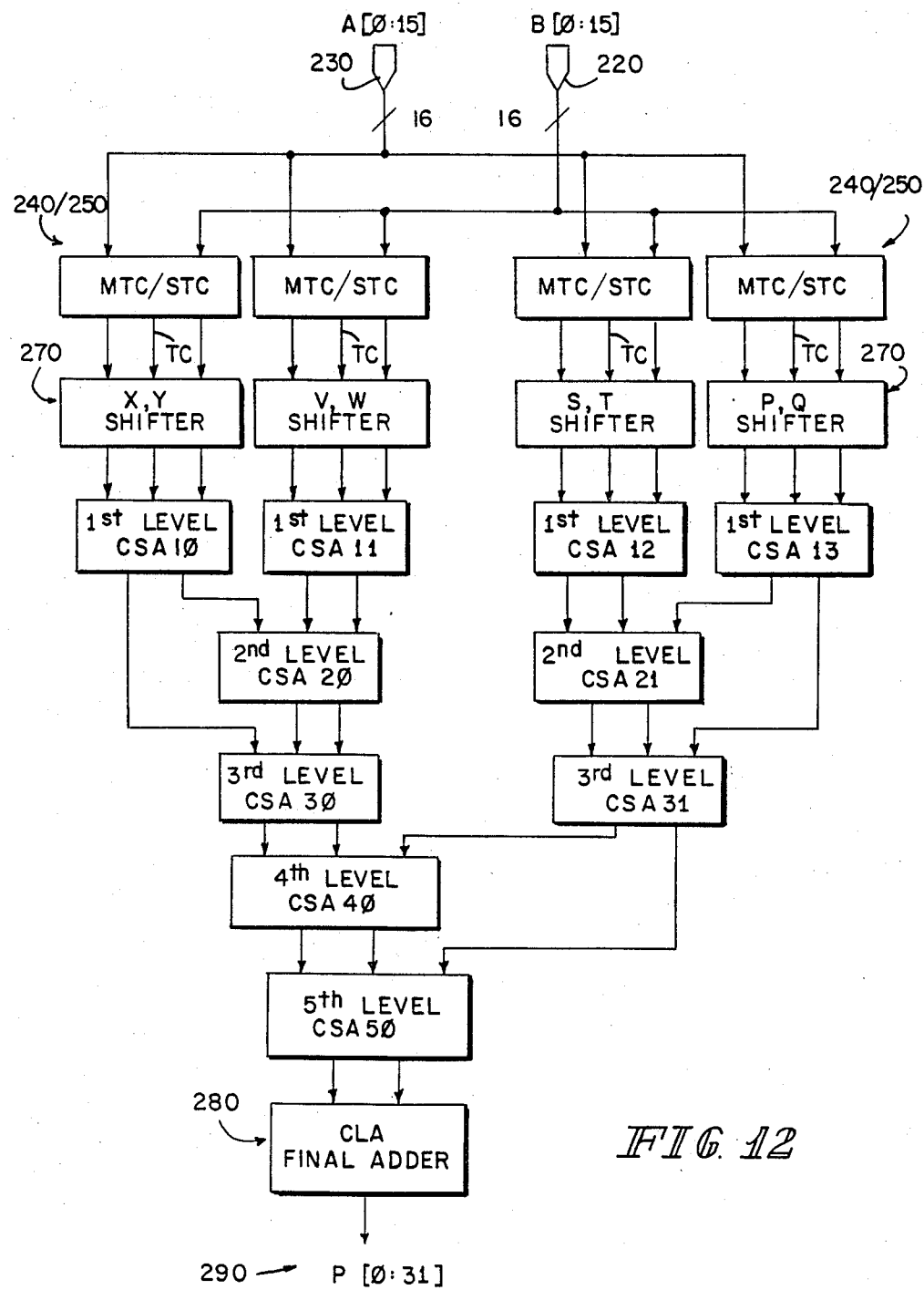
FIG. 12 is a block diagram of a 16×16 multiplier according to the principles of the present invention.

The application of the 4/K slice architecture of the 8-bit multiplier of FIG. 10 may be applied to a 16-bit multiplier as illustrated in FIGS. 12, 13a and 13b. The 16-bit multiplier B is provided at input 200 and the 16-bit multiplicand A is provided at input 230. Four parallel 4/K blocks of four bit splicing of the multiplier B is performed. A master/slave two's complement circuits 240/250 are provided with shifters 270. The eight vectors X,Y, V,W, S,T, P,Q are added using five levels of carry-save adders. The first level includes CSA10-CSA13, the second level CSA20 and CSA21, the third level CSA31, the fourth level CSA40 and the fifth level CSA50. The output of CSA50 is combined in a carry lookahead final adder 280 to provide the 32-bit output product P0-P31 at 290. The addition of the eight shifted multiplicand vectors and four shifted multiplier vectors require five levels of carry-save addition plus the final carry lookahead addition.

It should be noted that appropriate algorithms may be derived where only the multiplier A is two's complemented for possible utilization in binary multiplication. This approach offers relatively few advantages Over a full two's complementary multiplication according to the present invention. It adds one to two extra levels of logic to the final circuit and somewhat reduces the versatility of the multiplier by removing the ability to two's complement the multiplicand. One advantage would be the removal of the operand adder from the circuitry leading to potential savings of space in an integrated circuit implementation.

Although the Booth and modified Booth algorithms perform subtraction using two's complementation as well as having the ability to multiply signed and unsigned numbers, this is not to be confused with the present architecture, wherein a selection is made to perform totally unsigned multiplication or signed, two's complement multiplication of the total multiplier and multiplicand. In the Booth and modified Booth algorithms, selective partial products are produced by additions and subtractions and the total process is not carried out as signed or unsigned operation.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A binary multiplier for performing a binary multiplication of multiplicand and multiplier operands comprising:
   first means for selecting complement or non-complement multiplication as a function of non sign bits of one of said operands; and
   multiplication means for performing non-complement multiplication of the multiplier and multiplicand operands for a non-complement selection and for performing complement multiplication of the multiplier and multiplicand operands for a complement selection.

2. A binary multiplier according to claim 1, wherein said multiplication means includes means for adding said multiplier and multiplicand operands to a complement product of said multiplier and multiplicand operands for a complement selection.

3. A binary multiplier comprising:
   input means for receiving a multiplicand and a multiplier operands;
   determining means for determining and providing a two's complement signal when said multiplier operand has 1's in more than half of its bits;
   first complementer means for providing a multiplicand vector as a two's complement of said multiplicand operand in response to said two's complement signal or as said multiplicand operand in absence of said two's complement signal;
   second complementer means for providing shift control signals as a function of a two's complement of said multiplier operand in response to said two's complement signal or as a function of said multiplier operand in absence of said two's complement signal;
   shifter means for providing a plurality of shifted multiplicand vectors as a function of said shift control signals;
   operand adder means for adding said multiplicand and said multiplier operands and providing a sum signal; and
   product adder means for either adding said plurality of shifted multiplicand vectors and said sum signal in response to said two's complement signal or adding only said plurality of shifted multiplicand vectors in absence of said two's complement signal to produce a product.

4. A binary multiplier according to claim 3, wherein said operand adder means is in parallel with said shifter means between said input means and said product adder means.

5. A binary multiplier according to claim 3, wherein said multiplicand operand has K bits and said multiplier operand has M bits, and said operand adder means and product adder means add said multiplicand and multiplier operands to each other and to said plurality of shifted multiplicand vectors with the multiplicand operands being shifted, K bits and the multiplier being shifted M bits relative to the bits of said product in response to said two's complement signal.

6. A binary multiplier according to claim 5, wherein said product adder means and said product includes K+M bits, and including means for merging said sum signal with said shifted multiplicand vectors prior to adding in said product adder means.

7. A binary multiplier according to claim 6 including logic means for selecting which bits of which shifted multiplicand vectors said bits of said sum signal are merged as a function of said multiplier operand.

8. A binary multiplier according to claim 7, wherein some of the bits of said sum signal are pre-assigned to a particularly shifted multiplicand vector and other bits of said sum signal are assigned by said logic means as a function of said multiplier operand.

9. A binary multiplier according to claim 3, wherein said input means receives a 4-bit multiplier operand and a 4-bit multiplicand operand, said operand adder means is a 4-bit adder, said shifter means provides two shifted multiplicand vectors, and said product adder means produces an 8-bit product.

10. A binary multiplier according to claim 9, wherein first and second least significant bits of said sum signal are merged with said shifted multiplicand vector in said shifter means.

11. A binary multiplier according to claim 3, wherein said product adder means includes carry lookahead means responsive to said plurality of shifted multiplicand vectors and sum signals inputs to said product adder means.

12. A binary multiplier according to claim 3, including deep carry lookahead means responsive to said multiplicand vector and shift control signals for providing carry lookahead signals to said product adder means.

13. A binary multiplier according to claim 12, wherein said deep carry lookahead means is in parallel with said shifter means.

14. A binary multiplier according to claim 12, wherein said second complement means includes logic means for producing carry lookahead shift signals.

15. A binary multiplier comprising:
input means for receiving a multiplicand and a multiplier operands;
determining means for determining and providing a complement signal when said multiplier operand has 1's in more than half of its bits;
first complementer means for providing a multiplicand vector as a complement of said multiplicand operand in response to said complement signal or as said multiplicand operand in absence of said complement signal;
second complementer means for providing shift control signals as a function of a complement of said multiplier operand in response to said complement signal or as a function of said multiplier operand in absence of said complement signal;
shifter means for providing a plurality of shifted multiplicand vectors as a function of said shift control signals; and
adder means for adding said multiplicand operand, said multiplier operand and said plurality of shifted multiplicand vectors in response to said complement signal or adding only said plurality of shifted multiplicand vectors in absence of said complement signal to product a product.

16. A binary multiplier according to claim 15, wherein said shifting means includes merging means for merging bits of said operands with said shifted multiplicand vectors in response to said complement signal.

17. A binary multiplier according to claim 16, wherein:
said adder means includes an operand adder means for adding said multiplier operand and said multiplicand operand and providing a sum signal, and a product adder means for adding said shifted multiplicand vectors and a first portion of said sum signal; and
said merging means merges a second portion of said sum signal with said shifted multiplicand vectors prior to adding in said product adder means.

18. A binary multiplier according to claim 17, wherein said operand adder means is in parallel with said shifter means between said input means and said product adder means.

19. A binary multiplier according to claim 16, including logic means for selecting which bits of which shifted multiplicand vectors said bits of said operands are merged as a function of said multiplier operand.

20. A binary multiplier according to claim 19, wherein some of the bits of said operands are pre-assigned to a particularly shifted multiplicand vector and other bits of said operand are assigned by said logic means as a function of said multiplier operand.

21. A binary multiplier according to claim 16, wherein said merging means merges one of said operands with said shifted multiplicand vectors prior to adding in said adder means and said adder means adds the other operand with said merged vectors.

22. A binary multiplier according to claim 21, wherein said adder means includes a carry-save adder means for adding said other operand with said merged vectors to produce said product.

23. A binary multiplier according to claim 16, wherein said first complementer means complements each bit if said multiplicand operand in response to said complement signal and said merging means merges 1's into said shifted vectors to produce a two's complement.

24. A binary multiplier according to claim 15, wherein:
said determining means, first and second complementer means and shifter means include a plurality of determining means, first and second complementer means and shifter means in parallel and receiving all of the bits of said multiplicand operand and respective bits of said multiplier operand; and
said adder means including a plurality of intermediate adder means in parallel for adding a respective plurality of shifted multiplicand vectors, multiplicand operand and respective bits of said multiplier as a function of a respective complement signal to produce intermediate sums, and a final adding means for adding said intermediate sums to produce said product.

25. A binary multiplier according to claim 24, wherein each of said shifter means includes merge means for merging respective bits of said multiplier operand with respective shifted multiplicand vectors in response to a respective complement signal prior to said adder means and said intermediate adder means adds said multiplicand operand with respective merged vectors.

26. A binary multiplier according to claim 25, wherein said intermediate adding means are carry-save adder and said final adder means includes a tree of carry-save adders for providing a pair of final vectors and means for adding said pair of final vectors to produce said product.

27. A binary multiplier according to claim 15, wherein said adder means includes carry lookahead means responsive to said plurality of shifted multiplicand vectors.

28. A binary multiplier according to claim 15 including deep carry lookahead responsive to said multiplicand vector and shift control signals for providing carry lookahead signals to said adder means.

29. A binary multiplier according to claim 28, wherein said second complement means includes logic means for producing carry lookahead shift signals.

30. A binary multiplier according to claim 28, wherein said deep carry lookahead means is in parallel with said shifter means.

31. A method of performing binary multiplication of multiplicand and multiplier operands on a machine comprising:

selecting complement or non-complement multiplication as a function of non sign bits one of said operands;

performing non-complement multiplication for a non-complement selection; and performing complement multiplication for a complement selection.

32. A method according to claim 31, wherein performing complement multiplication includes adding said multiplier and multiplicand operand to complement product of said multiplier and multiplicand operand.

33. A method of performing binary multiplication of a multiplicand and multiplier operands on a machine comprising:

determining and providing a complement indication when a multiplier operand has 1's in more than half of its bits;

shifting a multiplicand operand as a function of said multiplier operand to produce a plurality of shifted multiplicand vectors, and adding said plurality of shifted multiplicand vectors in absence of a complement indication, complementing said multiplicand and multiplier operand, shifting said complemented multiplicand as a function of said complemented multiplier operand to produce a plurality of shift complemented multiplicand vectors, and adding said plurality of shifted complemented multiplicand vectors, said multiplier operand and said multiplicand operand in presence of a complement indication.

34. A method according to claim 33 including merging at least some bits of said operands with said complemented multiplicand vectors prior to adding.

* * * * *